United States Patent [19]

van der Hoek

[11] Patent Number: 4,468,088
[45] Date of Patent: Aug. 28, 1984

[54] OPTICAL TELECOMMUNICATION ELEMENT

[75] Inventor: Willem van der Hoek, Eindhoven, Netherlands

[73] Assignee: U.S. Philips Corporation, New York, N.Y.

[21] Appl. No.: 238,174

[22] Filed: Feb. 25, 1981

[30] Foreign Application Priority Data

Mar. 28, 1980 [NL] Netherlands ................. 8001832

[51] Int. Cl.³ ............................................. G02B 5/16
[52] U.S. Cl. ................................. 350/96.23; 350/96.24
[58] Field of Search ........................... 350/96.23, 96.24

[56] References Cited

U.S. PATENT DOCUMENTS

| 3,955,878 | 5/1976 | Nowak | 350/96.23 |
| 4,028,081 | 6/1977 | Marcatili | 350/96.23 |
| 4,039,248 | 8/1977 | Franke et al. | 350/96.23 |
| 4,205,899 | 6/1980 | King et al. | 350/96.23 |
| 4,226,504 | 10/1980 | Bellino | 350/96.23 |

FOREIGN PATENT DOCUMENTS

| 22036 | 1/1981 | European Pat. Off. | 350/96.23 |
| 2434280 | 2/1976 | Fed. Rep. of Germany | 350/96.23 |
| 2459997 | 6/1976 | Fed. Rep. of Germany | 350/96.23 |
| 2833869 | 2/1980 | Fed. Rep. of Germany | 350/96.23 |
| 2854717 | 6/1980 | Fed. Rep. of Germany | 350/96.23 |
| 35651 | 3/1977 | Japan | 350/96.23 |
| 1470890 | 4/1977 | United Kingdom | 350/96.23 |
| 2035599 | 6/1980 | United Kingdom | 350/96.23 |

OTHER PUBLICATIONS

Bark et al., *Proceedings of the 27th Intern. Wire and Cable Symposium,* Cherry Hill, N.J. U.S.A., Nov. 14–16, 1978, "Fiber Optic Cable Design, Testing and Installation Experiences", pp. 379–384.

Primary Examiner—John D. Lee
Assistant Examiner—Frank González
Attorney, Agent, or Firm—Marc D. Schechter

[57] ABSTRACT

An optical telecommunication element comprising one or more undulating optical fibers in which each fiber extends along a sheath. Each fiber is in the form of a helix or quasi-helix which has an alternating left-handed and right-handed pitch. The fibers are fixed on the inner wall of the sheath at points of pitch reversal, the fibers preferably being fixed by glued joints.

5 Claims, 6 Drawing Figures

OPTICAL TELECOMMUNICATION ELEMENT

BACKGROUND OF THE INVENTION

The invention relates to an optical telecommunication element which comprises an undulated optical fiber inside a cylindrical sheath. The undulated optical fiber is fixed at periodic locations on the inner wall of the cylindrical sheath.

Such an element is disclosed in U.S. Pat. No. 4,039,248. In the known element one optical fiber is used. The fiber extends sinusoidally or substantially sinusoidally inside the sheath. (FIGS. 3–6.) The optical fiber may be situated in one plane but may also be successively orientated in several planes which enclose acute angles relative to one another. (FIG. 1b.) The amplitude of the sinusoidal optical fiber corresponds to the inside diameter of the sheath. By using a sheath whose inner surface comprises internal protusions or by using discs provided in the sheath the optical fiber is fixed inside the sheath.

The optical fiber described in U.S. Pat. No. 4,039,248 has a much smaller coefficient of expansion than the sheath of synthetic resin. Temperature variations will therefore cause a compressive force or tensile (pulling) force to be exerted on the fiber so that at the locations where the fiber is fixed to the sheath wall, variation in the radius of curvature and micro-bends will occur. This results in very considerable signal losses, and there is also a fair chance that the fiber will develop microcracks and finally break. The known element has the additional disadvantage that positioning and, in particular, fixing of the fiber inside the sheath is rather complicated. The manufacturing process can easily give rise to errors so that this process is rather critical and consequently is expensive.

SUMMARY OF THE INVENTION

It is an object of the invention to provide an optical telecommunication element which mitigates that above mentioned disadvantages. According to the present invention this is achieved with an optical telecommunication element in which the optical fiber extends inside the sheath in the form of an alternating left-handed/right-handed helix or quasi-helix. The optical fiber is fixed to the inner wall of the sheath at the points of reversal of the direction of the helix (helix pitch).

Since the optical fiber is fixed to the sheath at the points of reversal of the direction of the pitch, the optical fiber will not be subject to variations in radius of curvature, microbends, or movements in the axial or tangential direction at the points of attachment due to expansion or shrinkage of the sheath. As a result of this, the above-mentioned disadvantages in the known device are substantially avoided. The amplitude of the helix or quasi-helix is preferably smaller than the inside diameter of the sheath so that no friction occurs between the fiber and the sheath.

As a rule the optical fiber will have the shape of a quasi-helix. By the expression "quasi-helix" is meant a configuration which differs from an actual helix which has a constant radius and pitch angle. A quasi-helix has a configuration in which the radius and the pitch angle may vary continuously. In projection a helix becomes circular, whereas the projected quasi-helix is pear-shaped.

In a favorable embodiment of the invention, the optical fiber is fixed (by means of a glued joint) on the inner surface of the sheath. A glued joint has processing advantages, as will become apparent from the description of the figures, below.

In a further favorable embodiment of the optical telecommunication element according to the invention, a helically wound optical fiber varies its direction of pitch periodically after at most a 360° rotation. This embodiment gives rise to processing advantages because, for example, the optical fiber storage reels may be fixed, which simplifies the manufacturing process considerably. Preferably, after a rotation of 270°–330° the pitch is changed from a left-hand pitch to a right-hand pitch, or conversely. By using this measure, an optical telecommunication element is obtained which can very readily withstand external forces, in particular bending forces.

In still another favorable embodiment of the invention, several helically wound optical fibers are used. The fibers are separated tangentially by small distance from each other. The advantages of using several optical fibers are evident. The number of fibers is not restricted to narrow limits and may be chosen at will according to the field of application of the element (provided there is sufficient space for the fibers inside the sheath). Of course more space can be obtained by increasing the diameter of the sheath.

The invention also relates to a method of manufacturing a telecommunication element as described above. In the method, a thin-walled cylindrical sheath is extruded and one or several optical fibers are continuously introduced into the sheath. The optical fibers are moved longitudinally in the longitudinal direction of the sheath and rotationally with a periodic reversal of the rotation. A quantity of glue is introduced periodically into the sheath in order to fix the optical fibers on the inner wall of the sheath at the locations where a reversal of the rotational movement takes place.

The invention further relates to a machine for performing the above method. The machine comprises an extrusion head having an annular slot-shaped aperture and a central aperture. A hollow shaft extends through the central aperture and is connected to means which rotate the hollow shaft. A concentric tube is provided inside the hollow shaft and input and output apertures are provided in the hollow shaft and tube for guiding one or several optical fibers and communicating with a device for dispensing glue.

In a favorable embodiment of the device the end of the hollow shaft on the side of the output apertures comprises a cylindrical cam which has guiding grooves for the optical fibers on its outer surface. The shaft end also comprises internal radially extending ducts which are connected at one end to the tube inside the hollow shaft and which at the other end open into apertures which are provided in the outer surface of the cam.

DESCRIPTION OF THE PREFERRED EMBODIMENTS

Figure 1:
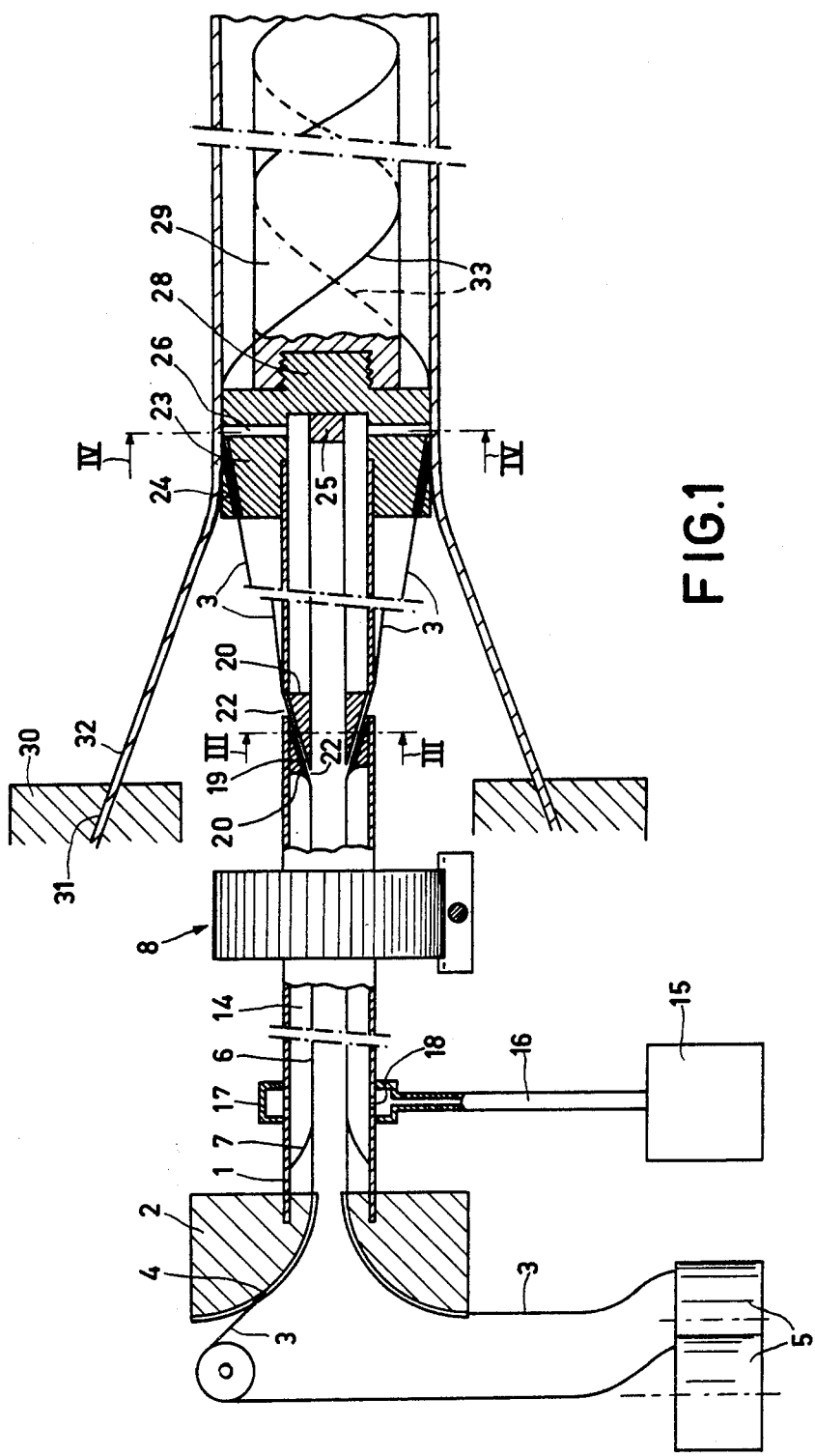
FIG. 1 is a cross-sectional view of a device for manufacturing the optical telecommunication element according to the invention.

Reference numeral 1 in FIG. 1 denotes a hollow shaft which is preferably metal and which comprises at one end an input member 2 for a bundle of optical fibers 3. The optical fibers 3 enter the hollow shaft 1 via grooves 4 which are regularly divided over the conical surface of the input member 2. The number of optical fibers 3 is not restricted to narrow limits and may be, for example, from 5 to 300 strands. Each optical fiber originates from a storage reel 5. Hollow shaft 1 comprises internally a concentric tube 6 which is preferably also metal and which is connected to shaft 1 near the input member 2 by means of a conical end face 7.

Figure 2:
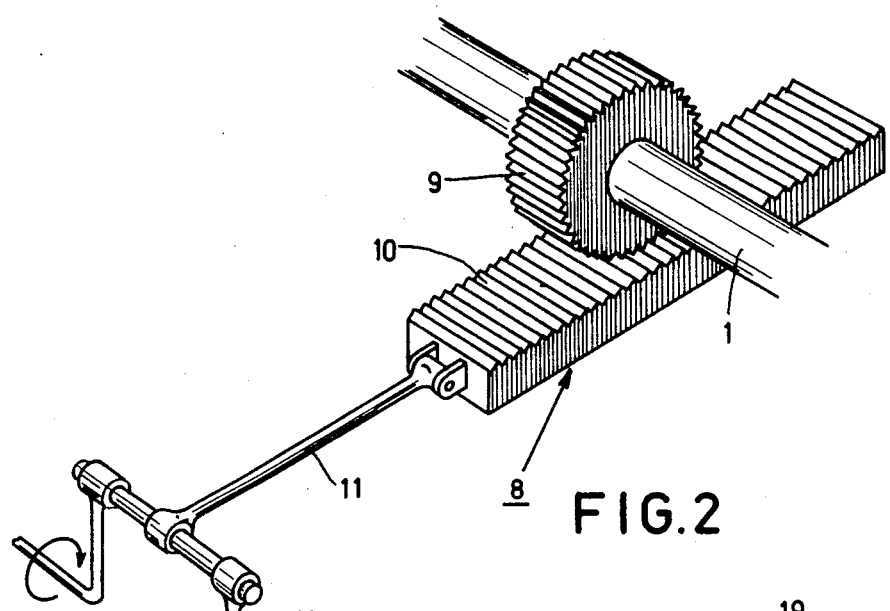
FIG. 2 is a perspective view of the driving mechanism of the device shown in FIG. 1.

The assembly of shaft 1 and tube 6 is rotated by means of a driving mechanism 8. The direction of rotation of the assembly is periodically reversed. For this purpose the driving mechanism 8, as shown diagrammatically in FIG. 2, comprises a toothed wheel 9 which is connected to hollow shaft 1. Wheel 9 engages a toothed rack 10 which is connected to crank 12 of crankshaft 13 via a driving rod 11. Upon rotation of crankshaft 13 a rotational movement varying its direction periodically is imparted to toothed wheel 9.

In the annular space 14 between the shaft 1 and the tube 6 glue is introduced periodically from a glue reservoir 15 which communicates with space 14 via inlet duct 16, rotation seal 17 and apertures 18 provided in shaft 1.

Figure 3:
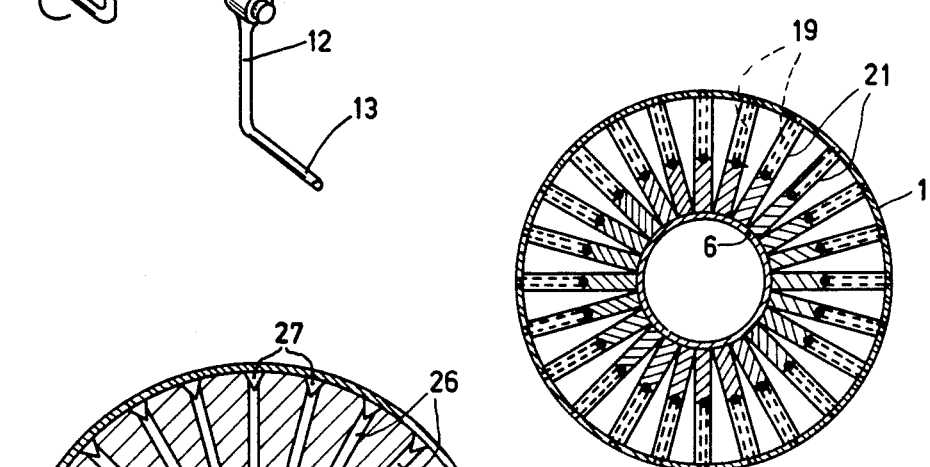
FIG. 3 is a sectional view taken on line III—III of FIG. 1.

The optical fibers 3 extending inside the tube 6 are guided to the outer surface of shaft 1 via leadthrough chambers 19 extending between the shaft 1 and the tube 6. The lead-through chambers which are shown in the cross-sectional view of FIG. 3 are formed by partitions 20 which are situated in parallel planes at right angles to the shaft 1 and are connected by a number of longitudinal discs 21 (FIG. 3). The upper and lower sides of chambers 19 are formed by parts of shaft 1 and tube 6, respectively, and each have an aperture 22.

Figure 4:
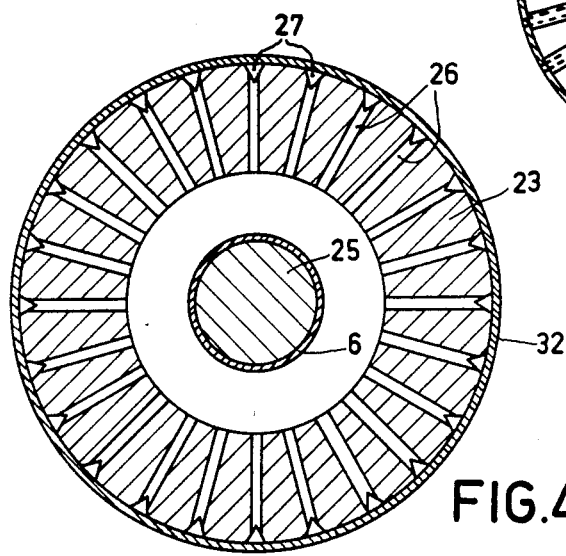
FIG. 4 is a sectional view taken on line IV—IV of FIG. 1.

The optical fibers 3 guided outside the shaft 1 then pass over a comb 23 provided at the end of shaft 1. At its outer surface comb 23 comprises guide grooves 24 and comprises a central stopper 25 which closes the tube 6. Comb 23 further comprises radial ducts 26 which communicate at one end with annular space 14 and at the other end open into apertures 27 (as shown in FIG. 4) provided in the cylindrical outer surface of comb 23. Remote from the stopper 25 the comb 23 has a screwthreaded connection part 28 which is connected to a supporting pin 29. The diameter of supporting pin 29 is slightly smaller than that of comb 23. By means of an extruder 30, which has an annular slot-shaped aperture 31, a sheath 32 of synthetic resin is extruded over the cylindrical outer surface of comb 23.

The optical fibers 3 passing over the reciprocating comb 23 will follow a helical path with alternately left-handed and right-handed pitch. Each time the direction of rotation of the comb changes, glue is supplied in a small quantity via ducts 26. As a result, the optical fibers will be fixed on the inner surface of sheath 32 at the points of pitch reversal. The sheath 32 can be deformed plastically by axial tensile load. As a result, the sheath becomes slightly thinner. The amplitude of the optical fibers decreases and becomes smaller than the diameter of the sheath 32. With the exception of the adhesion points, the fibers will have no contact with the inner wall of sheath 32. The fibers, after the spotwise adhesion to the sheath 32, are temporarily supported by pin 29. The broken line of numeral 33 as shown in FIG. 1 indicates the path of the relevant optical fiber situated behind pin 29. The optical fibers, after passing supporting pin 29, will follow a quasi-helical path having a pear shaped projection instead of a circular projection as a result of their own weight and the torques fixed at the adhesion points.

Figure 5:
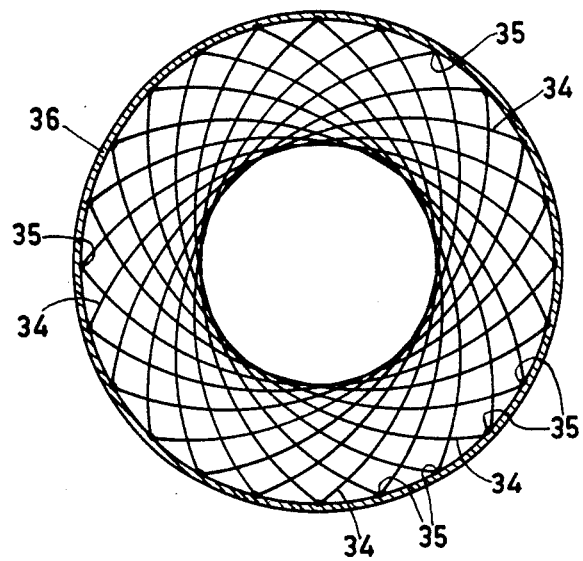
FIG. 5 is a cross-sectional view of a telecommunication element according to the invention comprising several optical fibers.

FIG. 5 is a cross-sectional view of an optical telecommunication element obtained in the above manner. Reference numeral 34 denotes twelve quasi-helical optical fibers in the element. Each optical fiber is fixed periodically on the inner wall of sheath 36 of synthetic resin, in this case after each rotation, by means of glue 35.

The adhesion points are also the points of reversal of the direction of the pitch of each optical fiber. The adhesion points are situated in planes which are at right angles to sheath 36 and are rotated relative to each other around the axis of the element. The quasi-helical configuration of each optical fiber in which the pitch angle and the amplitude vary continuously, gives a pear shaped projection which is clearly visible from FIG. 5. The maximum amplitude of the optical fibers is smaller than the diameter of the sheath.

Figure 6:
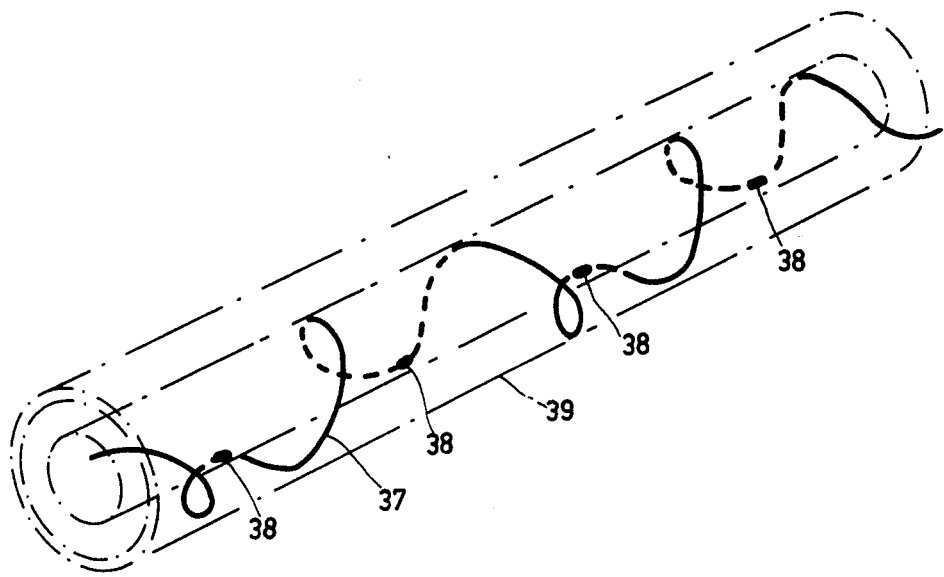
FIG. 6 is a perspective view of an optical fiber in an optical telecommunication element according to the invention.

FIG. 6 is a perspective view of a quasi-helical configuration with alternating left-handed and right-handed ptich of one optical fiber. The optical fiber 37 is fixed on the wall of the sheath 39 of synthetic resin at the points of reversal 38.

What is claimed is:

1. An optical telecommunication element comprising:
   a cylindrical sheath having an inner wall and having an axis; and
   at least one optical fiber inside the sheath, said optical fiber following a helical or quasi-helical path having alternating left-handed and right-handed pitch as the fiber winds down the axis, said optical fiber being fixed to the inner wall of the sheath at points where the pitch changes handedness.

2. An optical telecommunication element as claimed in claim 1, characterized in that the optical fiber is fixed to the inner wall of the sheath by a glued joint.

3. An optical telecommunication element as claimed n claim 2, characterized in that the pitch changes handedness on or before each 360° rotation of the helical or quasi-helical path of the optical fiber around the axis.

4. An optical telecommunication element as claimed in claim 1, characterized in that the pitch changes handedness on or before each 360° rotation of the helical or quasi-helical path of the optical fiber around the axis.

5. An optical telecommunication element as claimed in claim 4, characterized in that there are at least two optical fibers in the sheath, points where the two fibers are fixed to the sheath being separated along the circumference of the inner wall of the sheath.

* * * * *